May 14, 1963  E. D. ROBBINS  3,089,316
DRUM TYPE FREEZER FOR PEAS AND THE LIKE
Filed Nov. 14, 1960  7 Sheets-Sheet 1

EARL D. ROBBINS
*INVENTOR.*

BY
*Smith + Tuck*

EARL D. ROBBINS
*INVENTOR.*

BY Smith & Tuck

May 14, 1963 E. D. ROBBINS 3,089,316
DRUM TYPE FREEZER FOR PEAS AND THE LIKE
Filed Nov. 14, 1960 7 Sheets-Sheet 3
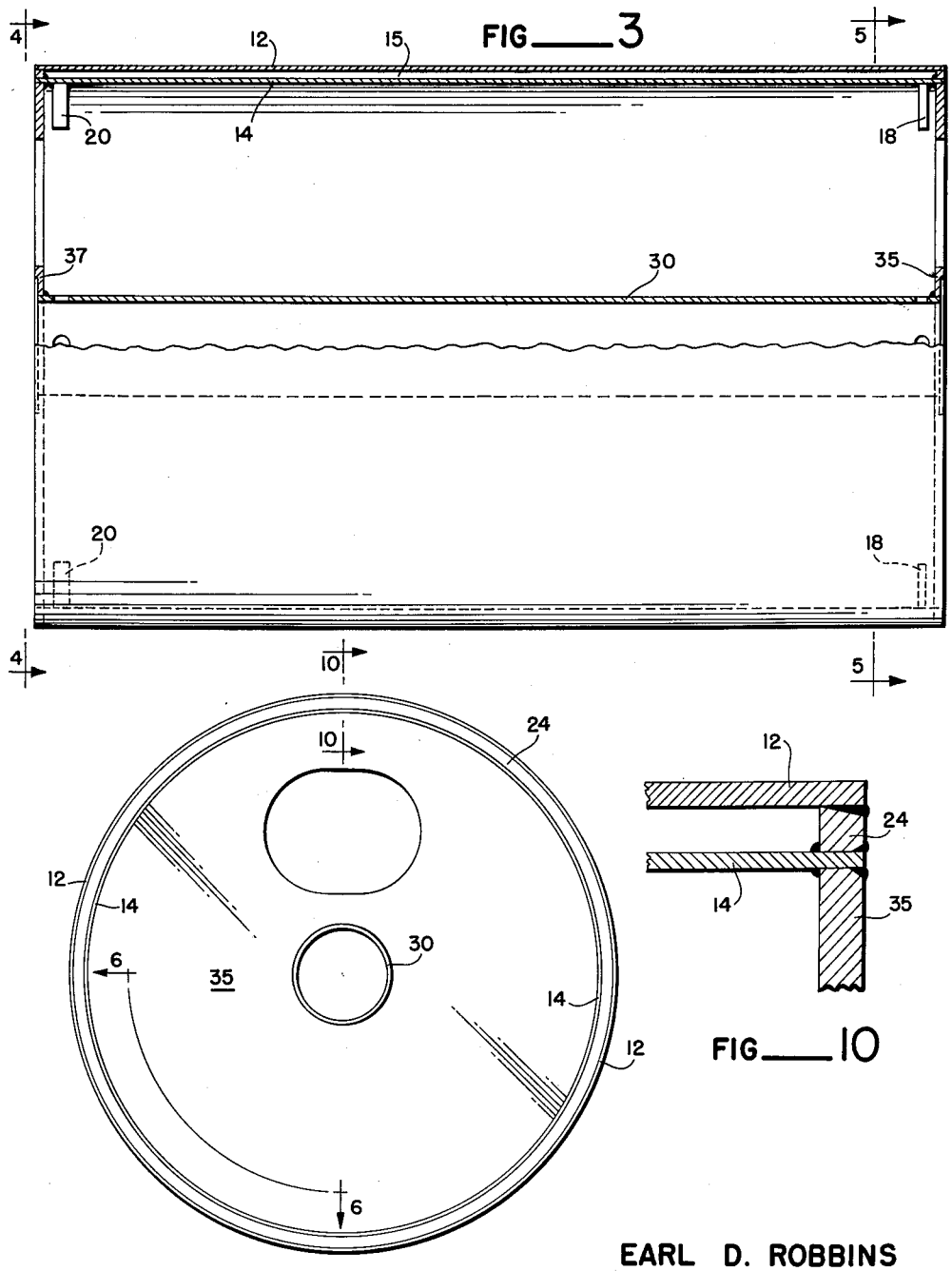
EARL D. ROBBINS
*INVENTOR.*
BY
*Smith & Tuck*

May 14, 1963 E. D. ROBBINS 3,089,316
DRUM TYPE FREEZER FOR PEAS AND THE LIKE
Filed Nov. 14, 1960 7 Sheets-Sheet 4
FIG.__5
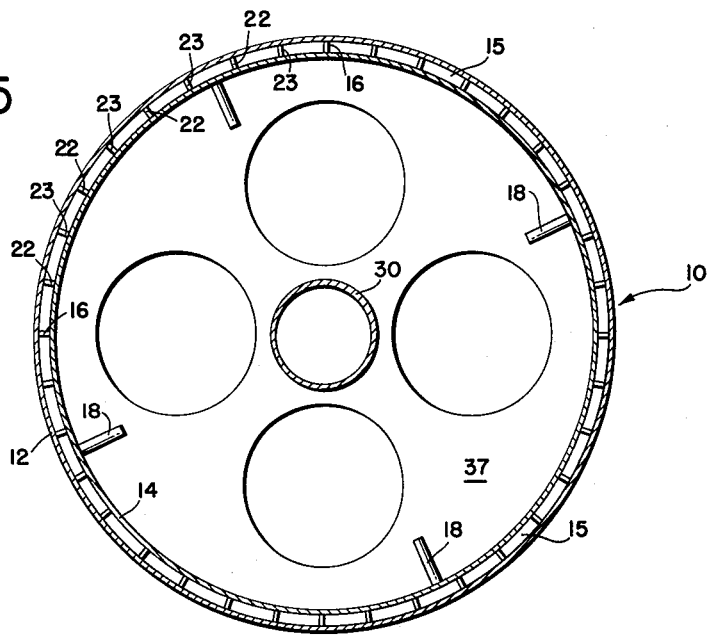
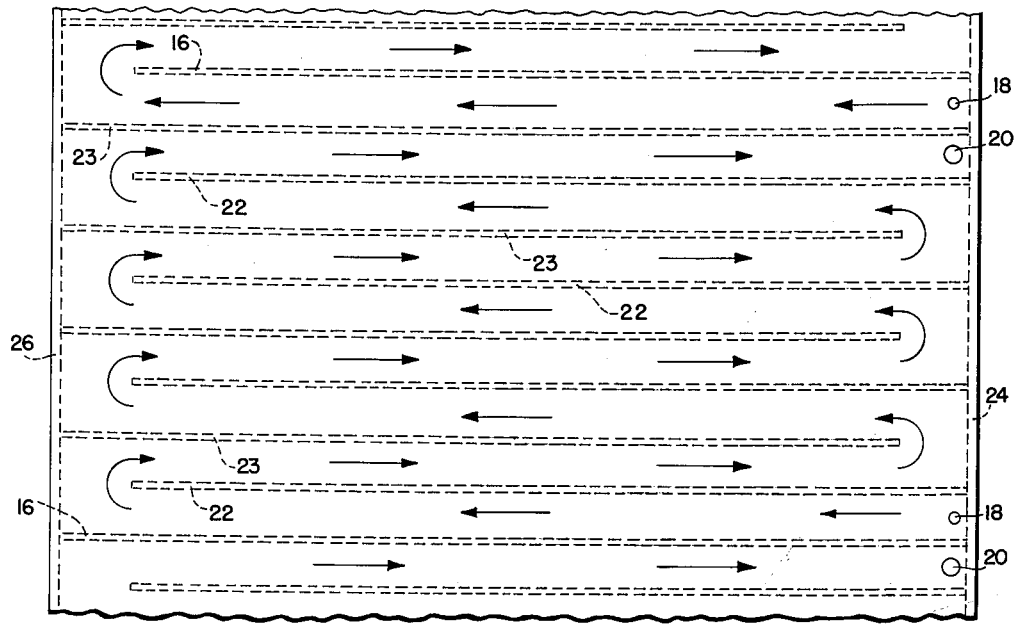
FIG.__6
EARL D. ROBBINS
*INVENTOR.*
BY
*Smith & Tuck*

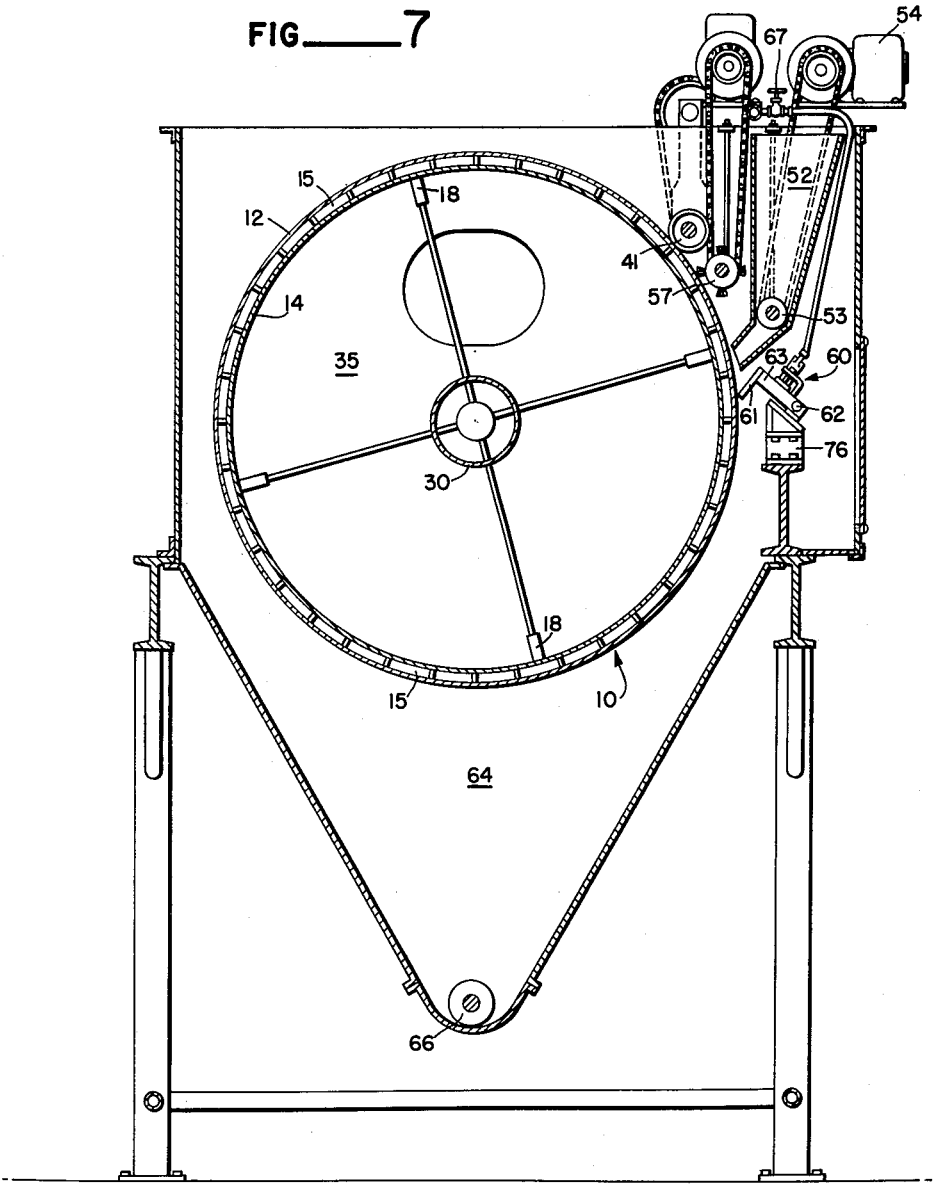

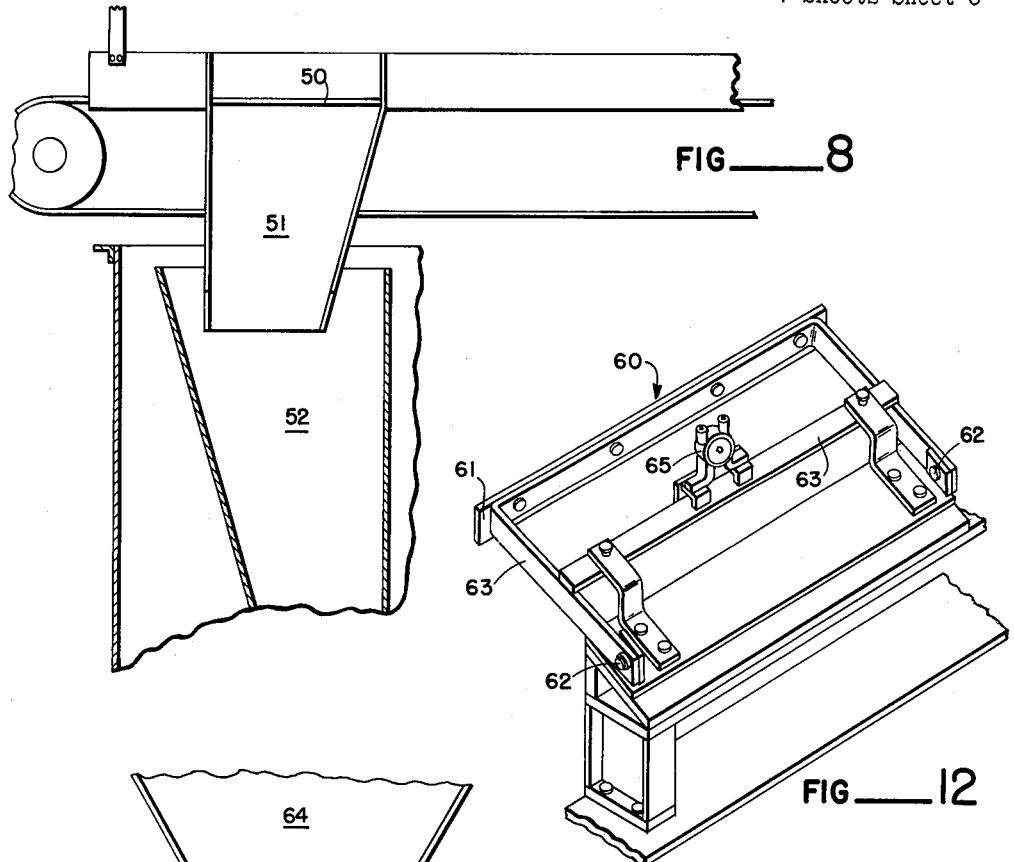
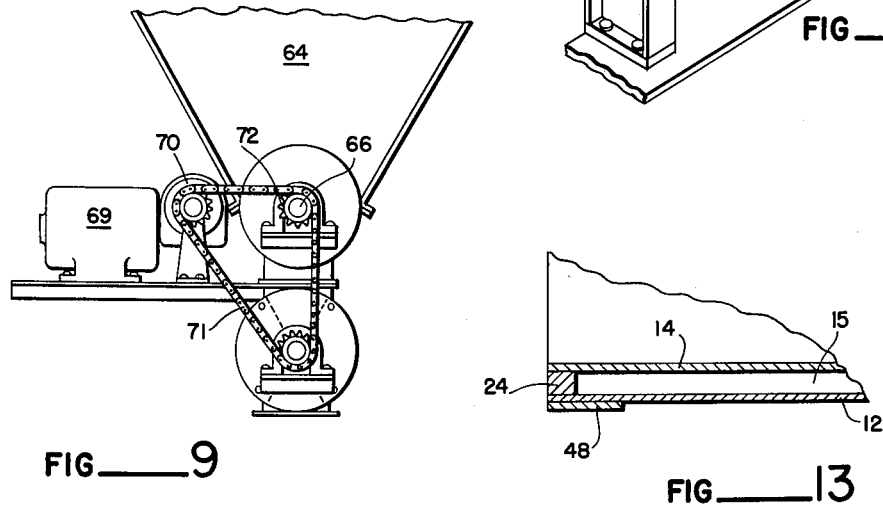

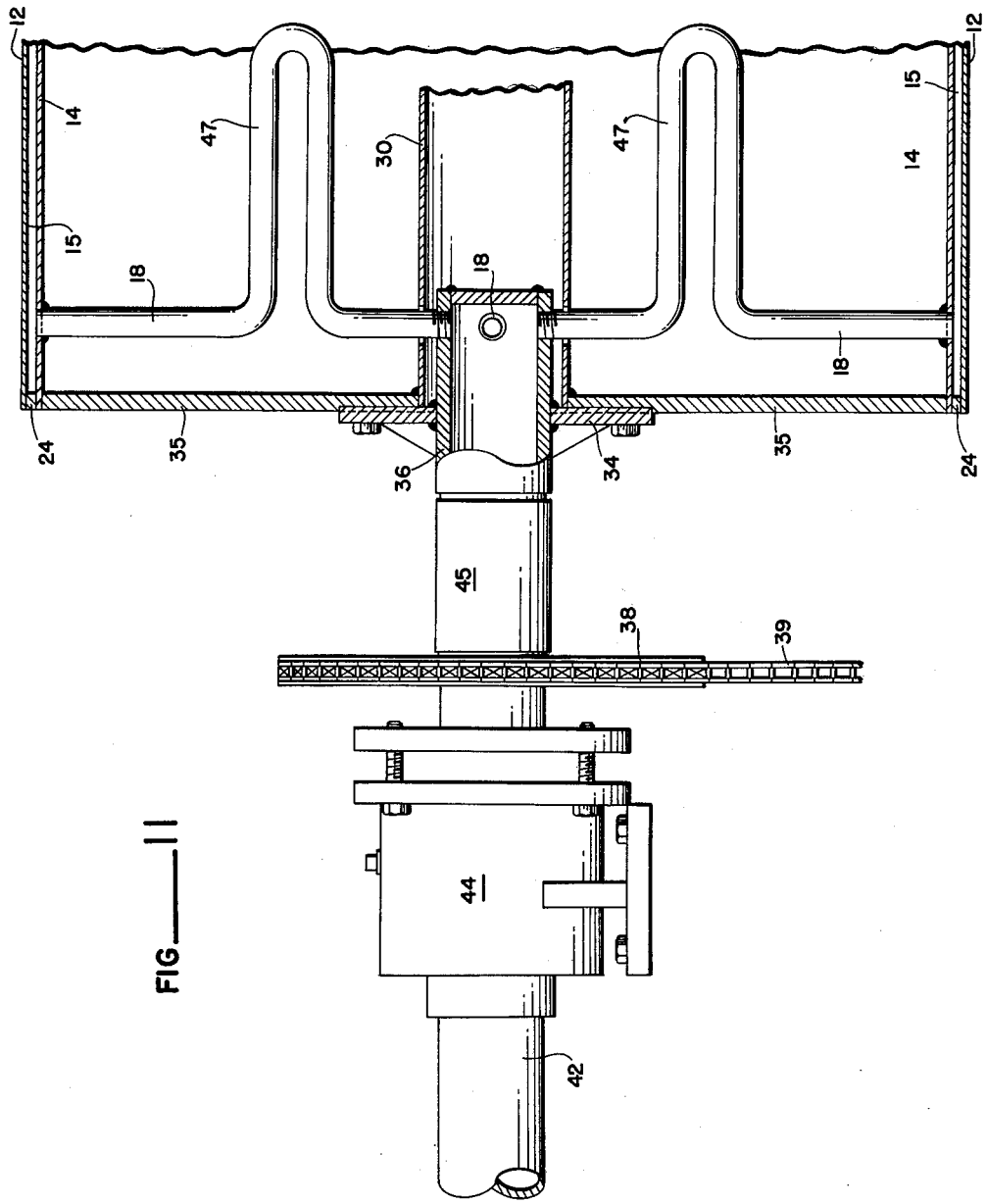

3,089,316
Patented May 14, 1963

3,089,316
DRUM TYPE FREEZER FOR PEAS AND THE LIKE
Earl D. Robbins, Everson, Wash., assignor of three-eighths to Gail C. Shapley, and three-eighths to Harry G. Callow, Seattle, Wash.
Filed Nov. 14, 1960, Ser. No. 69,011
8 Claims. (Cl. 62—346)

This present invention relates to the general art of quick freezing of small food particles especially, such as peas, beans, corn kernels and other foods where small kernels or particles can be easily handled without damage to their shape or structure. More particularly, this invention relates to a drum-type freezer disposed for revolution about a horizontal axis which is so arranged that a freezing surface is provided on the exterior surface of the drum and a second freezing surface is provided on an interior plate concentrically disposed with the outer plate and separated therefrom sufficiently to provide a refrigerant circulatory space.

Although quick freezing of vegetables and other foods has been under development for many years, the recently greatly increased market for frozen products has had the effect of creating keen competition in the various methods of freezing and handling. It has become increasingly necessary for suppliers to be ever alert to employ the latest technological advancements in the field and to constantly improve their methods so that production costs can be lowered and consequently the price of frozen products to the ultimate consumer can be reduced. The general price reduction will naturally have the effect of further increasing the consumption of such products. Wide spread facilities are now available for the practical transportation, storage and merchandising of foods which must be kept at a sub-zero temperature or at least at a temperature sufficiently low so that there will be no thawing or deterioration of the food products or vegetables. It is therefore important that the equipment provided will produce an end frozen product that is convenient to use and this means that the smaller food products, such as peas, beans, corn kernels and the like should be individually frozen and placed so that they are separated and will normally be delivered to the housewife in such a condition that the preparation of small amounts of these foods is in effect simpler than the preparation of fresh products and the frozen product will have the advantage of being available at all times without regard to the production season.

In this present invention it is believed that a practical solution has been made of many of the perplexing problems confronting this industry.

A principal object of this invention therefore is to provide a revolving drum-type freezer which will give a high production rate of frozen products for the floor space occupied by the machine equipment.

A further object of this invention is to provide a drum-type freezing unit in which two concentric cylindrical shells of metal are used with a refrigerant space between the two metal plates so as to provide a first freezing surface on the outside of the drum and a second freezing surface on the inside of the drum, either of which surfaces may be used independently of the other.

A further object of this invention is to provide large cylindrical freezing surfaces upon which the products to be frozen can be spread out in a single thickness so that the individual peas, beans or the like can be individually frozen.

A further object of this invention is to provide a machine in which the freezing temperature is generated within the food proper by its contact with the refrigerated plate upon which it is placed and without relying upon the movement of refrigerated air over the products as a means of cooling, thus preventing dehydration of the foods.

A further object of this invention is to provide freezing means with pressure means which will insure that a single layer of the product to be frozen will with certainty adhere to the freezing surfaces and the application of this pressure means will be substantially uniform throughout the full length of the freezing surfaces.

A further object of this invention is to provide vibratory means for removing the frozen products so that they will not be damaged nor disfigured during this removal process.

Further objects, advantages and capabilities will be apparent from the description and disclosure in the drawings, or may be comprehended or are inherent in the device.

In the drawings:

FIGURE 3 is a side elevation, partly in section, of the refrigerated freezing drum employed in this equipment.

FIGURE 4 is an end view taken along the line 4—4 of FIGURE 3.

FIGURE 5 is a typical cross-sectional view through the freezing drum substantially as if taken along the line 5—5 of FIGURE 3, but illustrating the end plate of the modified form of machine.

FIGURE 6 is a fragmentary view representing the interior circulatory arrangement between the two shells of the drum as though a section was taken parallel to the line 6—6 of FIGURE 4 and then this section was flattened out for accuracy in showing this circulatory arrangement.

FIGURE 7 is a cross-sectional view of a modified form of my machine wherein freezing is done only on the outside of the drum with the view taken substantially along the line 2—2 of FIGURE 1.

FIGURE 8 is a fragmentary vertical longitudinal sectional view taken along the line 8—8 of FIGURE 1.

FIGURE 9 is a fragmentary end elevation as taken along the line 9—9 of FIGURE 1 and looking towards the lower portion of the machine.

FIGURE 10 is a fragmentary cross-sectional view on an enlarged scale taken along the line 10—10 of FIGURE 4.

FIGURE 11 is a cross-sectional view through the end of the freezing drum to illustrate the bearing support arrangement, the drive means for the drum, and the means of introducing refrigerant in between the spaced shells of the freezing drum or to remove the same in a circulatory arrangement as the piping is similar.

FIGURE 12 illustrates one of the vibratory units employed in removing the frozen food products from the shell of the freezing drum.

FIGURE 13 is a fragmentary cross-sectional view taken along the line 13—13 of FIGURE 1.

Figure 1:
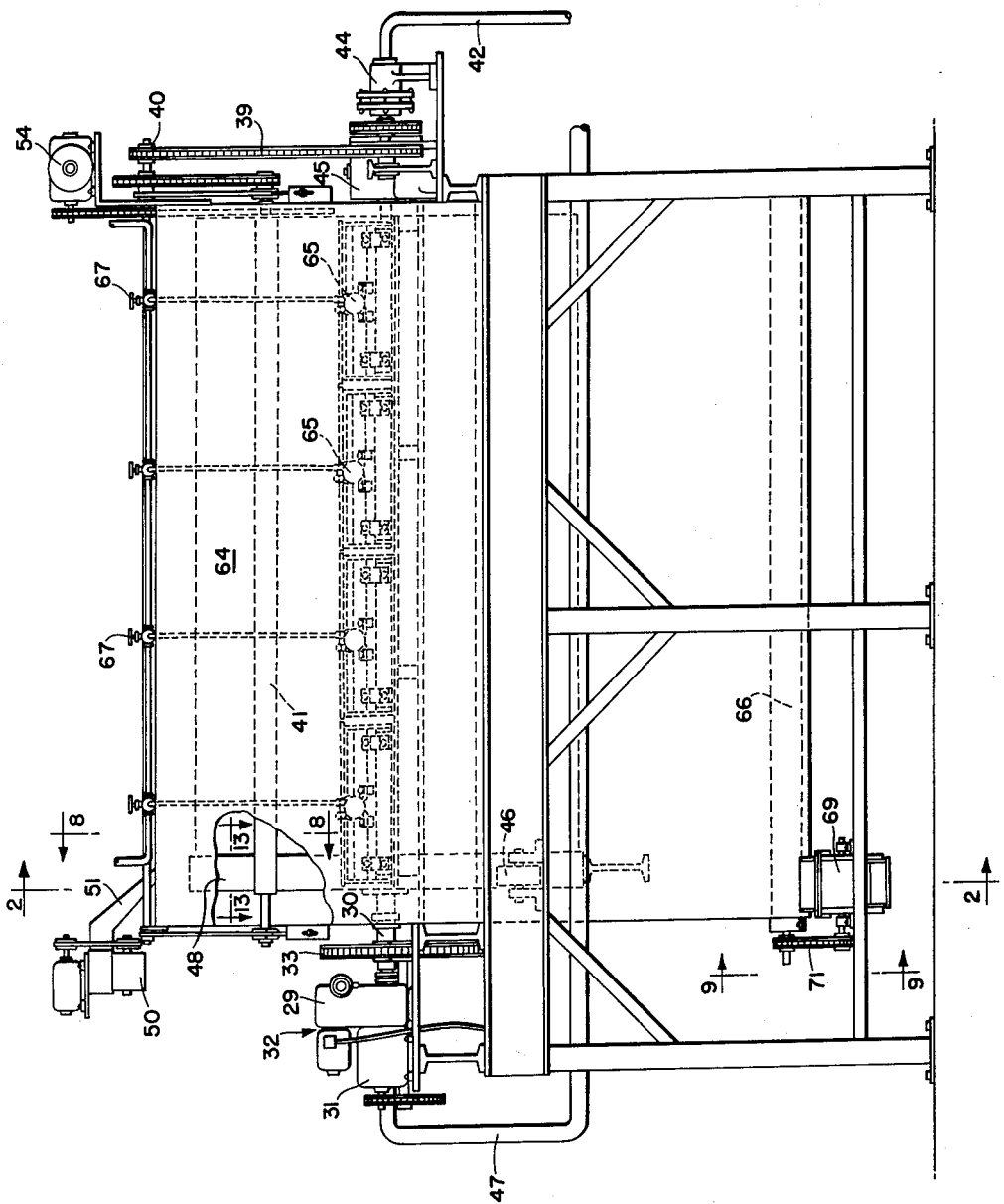
FIGURE 1 is a side elevation of a quick freezing unit made after the teachings of this present invention.

In the drawings, throughout which like reference numerals indicate like parts, the numeral 10 designates generally the cylinder or drum which is surface refrigerated and forms the freezing element of my quick freezing unit. Drum 10 is provided with two spaced apart concentric peripheral shell plates 12 and 14. These plates are preferably butt welded so as to provide a smooth exterior surface for plate 12 and a smooth interior surface for plate 14. These plates are spaced apart by partition members probably best illustrated in FIGURES 5 and 6. These consist of partition members 16 which serve to divide the peripheral refrigerant space 15 into arcuate sections of which there may be any reasonable number such as three, four or six. Each of these sections is provided with a supply pipe 18 and a discharge pipe 20. Intermediate partition members 16, which go from one end of the drum to the other, are a plurality of baffles 22 and 23. Baffles 22 are secured to the right hand end plate 24 as viewed in FIGURE 6 and are alternately disposed with respect to baffles 23, which are secured to the left hand end plate 26. In this manner outer and inner arcuate freezing surfaces are provided. The outer surface of shell plate 12 provides a convex freezing surface and the inner shell plate 14 provides a concave freezing surface. Either surface may be used singly or they may both be used at the same time.

The arrangement of partition plates 16, with the alternately disposed baffles 22 and 23 between them produces a fluid circulatory path illustrated by the various arrows of FIGURE 6, the flow being from the supply pipe 18 to the discharge pipe 20. It is desirable that the periphery of the freezing drum be made up of a plurality of units such as shown in FIGURE 6 so that there will be a minimum drop in the temperature of the refrigerant and consequently in the temperature of the freezing surfaces. The number of the refrigerant units will normally be a function of the diameter of drum 10.

Drum 10 may be variously supported for revolution about its longitudinal axis. As the drum itself revolves it is necesary that the supply and return of the refrigerant be through the means of pipes that are coaxially disposed with the center of the revolution of the drum. One satisfactory drum means is illustrated in FIGURES 1 and 11.

A coaxially disposed power shaft is provided at 30. This is driven through a suitable power unit shown generally at 32. This normally consists of an electric motor with suitable reduction means to the final drive for shaft 30. The final drive will be at low speed because a suitable commercial size of this equipment contemplates at least a six foot diameter for drum 10, and in order to take care of the placement for the materials to be frozen on the drum and to remove the same the drum should be arranged with variable drive means to provide a final revolution speed of the drum in the range of one revolution per minute to one revolution in six minutes. Shaft 30 is normally provided as a metal tube of appreciable diameter so that the bore of the same can be employed directly or as a support for additional piping serving as a refrigerant path along the axis of rotation. A suitable power variable speed means 29 and speed reduction means 31 is shown in FIGURE 1 which terminates in the slow speed chain drive 33 secured to shaft 30. Shaft 30 extends the full length through drum 10 and the opposite or driving end is shown in FIGURE 11, in which tube 30 has a suitable plate 34 secured to it as by welding and this plate in turn is secured to the end wall 35 of drum 10. Additionally, plate 34 is fixedly secured as by welding, to the refrigerant supply tube 36. Suitably secured to tube 34 is a driving sprocket 38 so that a suitable drive is provided for the drive chain 39 which provides a drive for shaft 40 which in turn drives the rubber faced roll 41 which distributes the product and resiliently presses the particles or kernels against the refrigerating shell for the instant required to insure sufficient contact so that the materials to be frozen will definitely adhere to the drum. It will be noted that there is also an interior roll 41a of similar construction. The purpose of this drive is to insure that the peripheral speed of rollers 41 and 41a will be exactly synchronized with the peripheral speed of the drum.

The refrigerant enters through supply pipe 42 and passes through the rotary gland member 44. These units are well known in the field and provide for the endwise coupling of a stationary tube to a revolving tube so that a fluid may be transferred from the stationary member to the rotary member. A suitable bearing 45 is provided to support the closed end of the drum and assure alignment of the axially disposed parts.

It is believed apparent that a bearing arrangement and fluid transfer similar to that shown in FIGURE 10 might be employed on the open end of the drum providing the interior surface was not being used. However, as one of the principal objects of this invention is to provide a machine of maximum capacity for the space occupied, it then becomes necessary to utilize the interior surface of plate 14, which without adding bulk or appreciable cost to the machine substantially doubles its output. In order to have a convenient ingress and egress to the interior of drum 10 it is desirable that one end of the drum be open. This requires additional support and for this purpose, especially because of the low speed of revolution of the drum, a convenient means is provided by the tangentially positioned roller 46 which bears upon a reinforced roller path 48 as shown in FIGURE 1.

Referring to FIGURE 7, a modified form of my machine is illustrated in which freezing is done only on the outside drum surface. Although this simplifies the machine, for many products the capacity is cut substantially in half. The left hand end of the drum 10, as shown in FIGURE 1, may be modified by elimination roller path 48 and rollers 46 and employing an end closure plate 37, which is shown in FIGURE 5. This would be welded in place, similarly to plate 35 at the opposite end of the drum.

The drive may be modified also by employing a flange similar to flange 34 shown in FIGURE 11 and also employing a bearing, adjacent to drive sprocket 33, to support the end of shaft 30 and in turn to support the left end of drum 10 if rollers 46 are not employed. To avoid unnecessary complication of the drawings, this structure, well understood in this field, is not shown in detail but is generally indicated in FIGURE 1 at 32.

The refrigerant circulatory system is identical in both the preferred and modified forms of the invention. FIGURE 11 illustrates the employment of a gland coupling which is also used on the left hand end or feed end of drum 10 to couple the refrigerant discharge to the return pipe 43. A discharge connecting pipe 20 is employed similar to pipe 18 to connect the refrigerant space, including the expansion bends 47, although an increased diameter is desirable as indicated in FIGURE 1 to take care of the pressure drop in the refrigerant.

As the equipment employed to place the products to be frozen on the outside and on the inside of the drum is identical, except for such modifications as are required to suit them respectively for an engagement with the exterior or interior shell, 12 or 14, reference will be made particularly to the equipment employed on the exterior surface.

In order to be specific, in one exemplary description, it is assumed that peas are to be frozen. Peas are of necessity processed prior to freezing so they come to the freezer over conveyor 50 in the final form they are to take, normally individual peas devoid of pod and treated to maintain color and flavor. The peas are discharged through chute 51 into a distributing chute 52, the peas normally being deposited at one end of the machine as will be noted in FIGURE 1. The walls of the distributing chute 52 taper so that all the peas will contact the feed screw auger 53 insuring an equal supply of peas throughout the length of said chute which now takes on the form of a feed hopper. Feed screw 53 is preferably driven by a separate motor indicated at 54 and a suitable belt or chain. Positioned near the discharge spout 55, which is in turn fed by screw 53, in a brush 57 arranged with a plurality of resilient brush members throughout its length. The purpose of the brush is to insure that only a single layer of peas will adhere to the freezer drum, it being understood that the peas which come damp to the freezer adhere immediately upon contact with the drum. However, those that are not in contact with the drum due to greater depth of peas are dislodged by brush 57 and will fill the voids left on the freezing surface. It is desirable to employ the separate motor 54 with a means for changing the speed of the distributor screw 53 so that the proper amount of peas will be placed on the freezing surfaces. As the peas progress on the drum, which is turning as indicated by arrows 58, they will pass under rollers 41 or on the interior roller arrangement 41a. These rollers extend the full length of the freezing surface and are very resilient, having a covering of sponge rubber or some of the newer plastic sponge materials so that the peas, which are now in a single layer as a result of passing under brush 57, are pressed firmly against the freezing surface but by a roller so resilient that the peas will not be crushed or distorted from their normal shape.

When the peas have made substantially one revolution, less the space occupied by members 41, 57 and 55, it is necessary to remove them from the drum and special means must again be provided so that the peas will not be injured. A preferred arrangement for this purpose is the chipper unit, of which a plurality are used, shown generally in FIGURE 2 at 60. This unit consists of a blade 61 having a rectangular cross section which is secured to frame 63 pivotably mounted at 62 to a fixed pivot, which is suitably supported by the means illustrated in FIGURES 2 and 12. Secured to frame 63 is a suitable vibratory unit 65. The speed and amplitude of vibration and the intensity thereof is controllable by valves 67, one of which controls each of the plurality of chipper units 60. The frozen peas when loosened from the freezing surfaces 12 or 14 drop and are collected in the trough-like apron 64 and 68 where they are collected by the feed augers 66 and 66a and moved to one end of the apron for final discharge. In the case of the peas removed from the interior surface 14, these are collected in the elongated bin 68 and moved to one end by the feed screw 66a.

Figure 2:
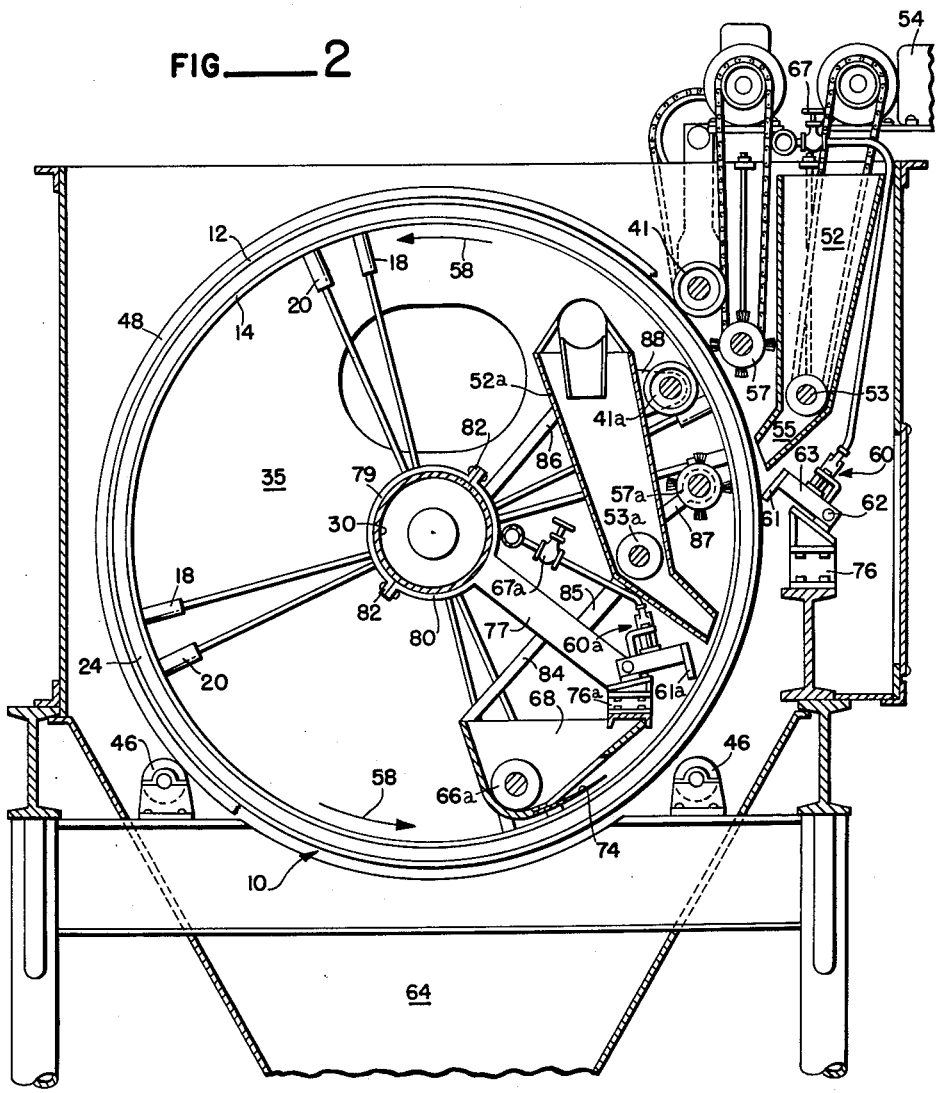
FIGURE 2 is a vertical cross-sectional view taken substantially along the plane of the line 2—2 of FIGURE 1 and shown on an enlarged scale.
Figure 14:
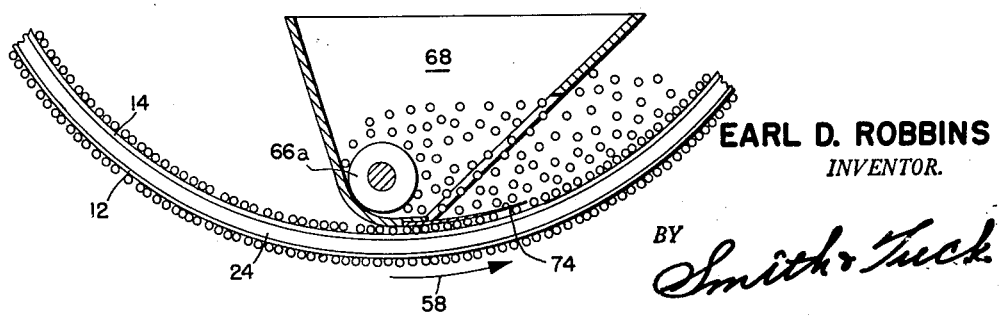
FIGURE 14 is an enlarged portion of FIGURE 2 and shows in sectional view the inside food recovery means.

In FIGURE 14 a portion of FIGURE 2 is illustrated on an increased scale and illustrates the means for recovering the peas or other foods which have been frozen and then removed from the interior freezing surface 14. The flexible apron 76 rides on the peas 75 still adhering to the inner freezing surface 14. Bin 68 is made of metal for stiffness as it is fully supported at the open end of drum 10 and interiorly supported from shaft 30 by the means best shown in FIGURE 2. The supporting means has a longitudinal structural beam 76 with one end fixedly anchored outside drum 10 and interiorly by the non-revolving support member 77. Member 77 has the two-piece strap means 79 and 80 which are joined together at 82 and encircle shaft 30 with an anti-friction lining as "Teflon" so shaft 30 may revolve inside the strap means. The other members as 64a, 41a, 53a and 57a all are supported outside drum 10 at its open end and these members extend the length of the drum and are tied together as by metal bars 84, 85, 86, 87 and 88 to give mutual support to the various elements. In this connection it is to be noted that the interior equipment is identical with the exterior and carry the same reference numerals with the added exponent "a." A suitable drive for the pea removing augers 66 and 66a is illustrated in FIGURE 7, consisting of the electric motor 69, a speed reducing means 70 and a suitable drive chain 71 with the associated brackets and idlers 72. It will be noted in FIGURES 1 and 2 that the equipment is shown as being raised appreciably and supported on a suitable framework consisting of structural beams and posts. The specific mounting arrangement of course forms no part of this invention as it will vary to suit local conditions.

It is believed that it will be clearly apparent from the above description and the disclosure in the drawings that the invention comprehends a novel construction of a drum type freezer for peas and the like.

Having thus disclosed my invention, I claim:

1. A cylindrical drum type freezer for peas and the like, comprising: a refrigerated, horizontal drum disposed for revolution about its longitudinal axis, said drum having two spaced apart concentric shell plates and end closure means forming a peripheral refrigerant chamber and an outer arcuate freezing surface; said chamber having means for causing an end to end circulation of refrigerant therethrough and having supply and discharge means for said refrigerant; means for revolvably supporting said drum; revolvable conduit means disposed on the axis of rotation of said drum for supplying refrigerant to said peripheral chamber and discharging it therefrom; means for coupling said revolvable conduit to fixed supply and discharge pipes; means for supplying peas and the like to said freezing surface and means for spreading the same in a single layer over said surface; a distributing chute extending the length of said drum having tapering walls; a power driven feed screw auger disposed adjacent the bottom of said chute and in contact with said walls to insure an equal supply of peas throughout the length of said distributing chute; means for resiliently pressing said peas and the like into intimate contact with said freezing surface and means for removing said peas and the like from said drum when frozen.

2. The subject matter of claim 1 in which said means for pressing said peas and the like into intimate contact with said freezing surface, comprises: a power driven rotary roller extending the length of said freezing surface and having a facing of resilient foam material of a temper to position peas and the like onto said freezing surface without causing any permanent change of shape or structure of said peas and the like.

3. The subject matter of claim 1 in which said means for removing frozen peas and the like from said drum, comprises: a blade, having a rectangular cross section, longitudinally disposed with said drum and parallel to the axis of rotation thereof; a frame for positioning said blade which is pivoted to fixed pivots; a vibratory unit supported by said frame, for vibrating said blade when removing the frozen peas and the like from said drum; trough means disposed below said blade to catch the peas and the like as they are removed from said drum and conveyor means for removing the peas and the like from said freezer.

4. The subject matter of claim 1 in which said means for spreading peas and the like in a single layer over the freezing surface, comprises a power driven rotary brush extending the length of the said freezing surface and in parallel relationship to and juxtapositioned to said distributing chute.

5. A cylindrical drum type freezer for foods in small or particle size, comprising: a refrigerated, horizontal drum disposed for revolution about its longitudinal axis, said drum having two spaced apart concentric shell plates forming a peripheral refrigerant chamber and outside and inside freezing surfaces; means for circulating a refrigerant through said refrigerant chamber and supply and discharge means for said refrigerant; means for revolvably supporting said drum; revolvable conduit means disposed on the axis of rotation of said drum for supplying refrigerant to said peripheral chamber and discharging it therefrom; means for coupling said revolvable conduit to fixed supply and discharge pipes; means for supplying food in particle or legume sizes to said freezing surfaces and means for spreading the same in a single layer over said surfaces; means for resiliently pressing said food into intimate contact with said freezing surfaces and means for removing said food from said drum when frozen comprising power driven vibratory means disposed to vibrate the metal freezing surface adjacent said food.

6. The subject matter of claim 1 in which said means for supplying peas and the like to said freezing surface, comprises: a longitudinally disposed bottomless peas and the like chute for distributing peas and the like throughout the length of said drum, the walls of said chute engaging said feed screw auger above the bottom of said chute; a discharge spout secured to said chute and angularly directed toward said drum to discharge peas and the like against said drum.

7. The combination according to claim 6 further provided with a power driven rotary brush extending throughout the length of said drum and positioned to engage peas and the like immediately after they have been deposited on said drum by said discharge spout and to insure that only one layer of peas or the like are carried by said drum for freezing.

8. The combination according to claim 1 wherein said means for removing said peas and the like from said drum when the peas and the like are frozen, comprises: power driven vibratory means for breaking the ice film causing the said peas and the like to adhere to said drum so the same may fall off said drum.

References Cited in the file of this patent

UNITED STATES PATENTS

| | | |
|---|---|---|
| 1,791,772 | Vogt | Feb. 10, 1931 |
| 1,965,617 | Vogt | July 10, 1934 |
| 1,965,619 | Vogt | July 10, 1934 |
| 1,987,852 | Horton | Jan. 15, 1935 |
| 2,123,596 | Doering | July 12, 1938 |
| 2,141,462 | Doering | Dec. 27, 1938 |
| 2,178,781 | Doering | Nov. 7, 1939 |
| 2,215,486 | Stone | Sept. 24, 1940 |
| 2,263,072 | Doering | Nov. 19, 1941 |